A. BERLINER.
PROCESS OF MAKING INCANDESCENT ELECTRIC LAMPS.
APPLICATION FILED DEC. 1, 1908.
1,094,774.
Patented Apr. 28, 1914.
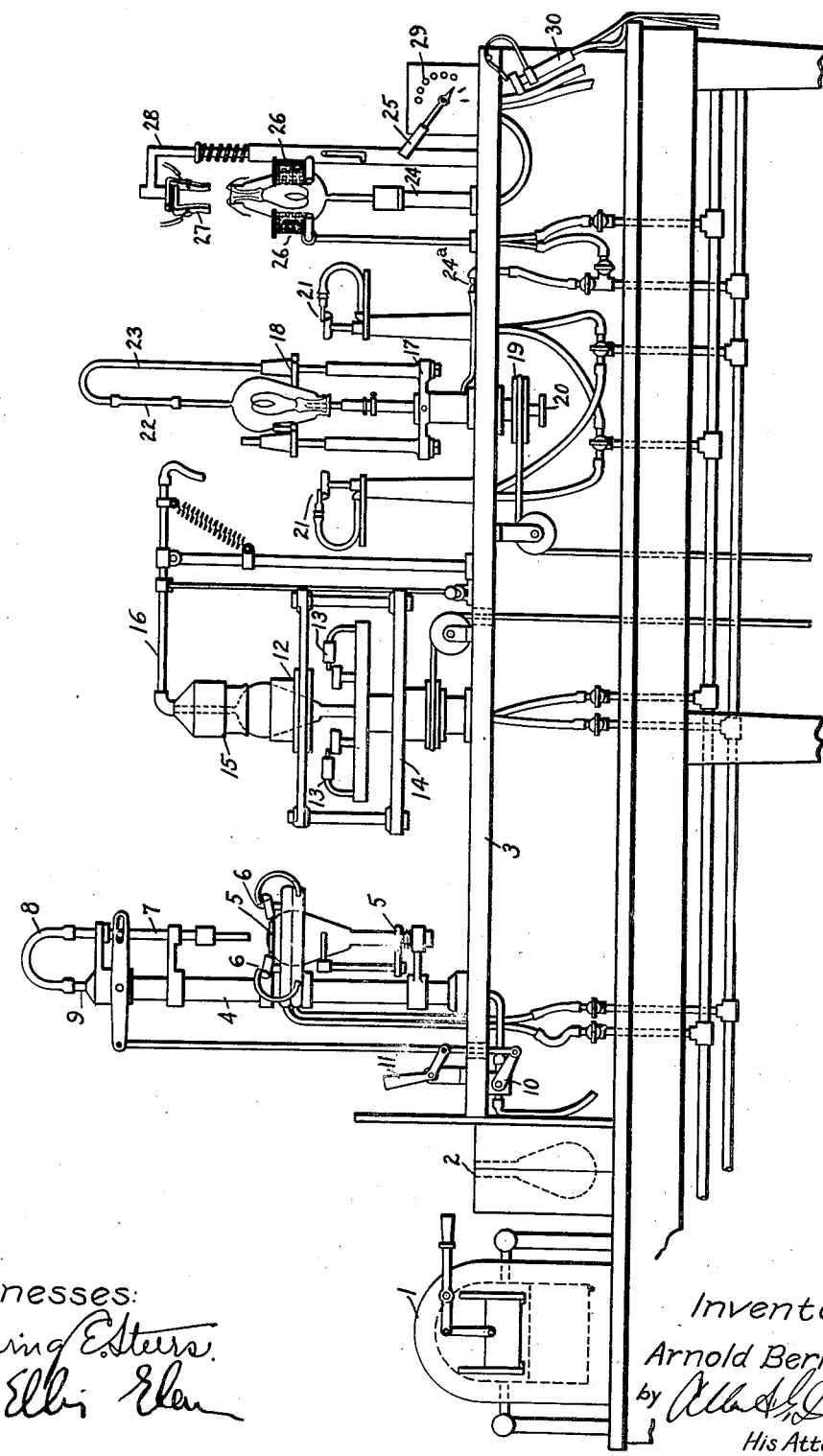
Witnesses:
Irving E. Steurs
J. Ellis Glen
Inventor
Arnold Berliner,
by
His Attorney.

UNITED STATES PATENT OFFICE.

ARNOLD BERLINER, OF BERLIN, GERMANY, ASSIGNOR TO GENERAL ELECTRIC COMPANY, A CORPORATION OF NEW YORK.

PROCESS OF MAKING INCANDESCENT ELECTRIC LAMPS.

1,094,774.  Specification of Letters Patent.  Patented Apr. 28, 1914.

Application filed December 1, 1908. Serial No. 465,540.

*To all whom it may concern:*

Be it known that I, ARNOLD BERLINER, a subject of the King of Prussia, residing at Berlin, Germany, have invented certain new and useful Improvements in Processes of Making Incandescent Electric Lamps, of which the following is a specification.

One of the most important factors tending to limit the life of incandescent electric lamps is the gradual liberation from the glass walls of gases which are occluded or absorbed by the glass, and when liberated either attack the filaments, or by impairing the vacuum cause electrical discharges from the filament, thereby entailing a gradual crumbling of the filament and the formation of a light absorbing deposit on the glass walls.

In the process of manufacture usually followed heretofore the bulbs of the incandescent lamps are made in the glass works and are not subjected to further operations until they have been in the incandescent lamp works for a long interval of time, during which the glass walls in a cold condition absorb all the elements composing atmospheric air, especially vapor of water. The absorption is promoted by dust which is deposited upon the glass walls during this interval and particularly during the transportation of the bulbs to the lamp factory, during which transit they are usually packed in straw. It is further necessary to wash the dust from the bulbs before they are manipulated in the lamp works, and during this washing the glass walls absorb water which cannot be removed even by subsequent careful drying in drying furnaces. It is therefore considered desirable and is customary to drive out and draw off to as great an extent as possible the absorbed or occluded gases and water from the glass walls by the application of a high degree of heat during the process of evacuation, but the difficulty cannot be entirely obviated by this means, since the heating can only be carried to the temperature at which the glass begins to soften, as otherwise the evacuated lamp bulbs are collapsed or forced in by the external air pressure, and such heating does not drive out all the gases.

According to the present invention the difficulty above referred to is obviated by preventing at all times any great absorption of gases by the glass walls, and in carrying out my invention the constituents of the glass are mixed and melted in pots in the lamp factory itself, where the bulbs are blown from the freshly made glass, preferably by means of air which is free from moisture, and then, as quickly as possible, and before much gas or water becomes occluded on the glass, are assembled in lamps, exhausted, and sealed off from the air pumps. From the standpoint of economy this method has a number of advantages. The transportation of the bulbs from the glass works to the lamp factory, as well as packing and unpacking, and the consequent breakage, is obviated; moreover, there is no need for the storage room which has heretofore been required for keeping the bulbs at the glass works, as well as at the lamp works, and the washing of the bulbs is unnecessary. Of particular importance, however, is the fact that the bulbs, by reason of the short time elapsing between manufacture and evacuation, absorb gases to a smaller extent than in the customary process of manufacture and absorb less moisture because no washing is necessary. While good results are obtained by reducing to a minimum the time between the blowing of the bulb and the completion of the lamp, the absorption of gases may be still further reduced by not permitting the bulbs to become entirely cold after blowing, but by subjecting them to further operations while still warm, the further operations consisting, as is well-known, in applying the tubulatures to the bulbs for the purpose of evacuation, and sealing-in or fusing to the bulbs the stems which carry the filaments, and then evacuating the bulbs. To this end, the work rooms, where these operations of putting on the tubulatures and completely assembling the lamps are successively performed, should adjoin the glass furnaces in the same room, or the bulbs may be brought into the work rooms from the furnaces in boxes that can be heated, and not until after the lamp is exhausted and sealed off are the bulbs permitted to cool except to such a point that the workmen can take hold of them for the successive operations without injury, so that the glass of the lamp never becomes cold from the time the glass is first made until after the completed lamp is sealed and taken from the exhaust pump.

Merely for the purpose of illustrating one of the various ways in which my invention may be carried out, I have shown diagrammatically on the accompanying drawing a glass furnace 1 in which suitable materials are fused to form fresh glass from which the various parts of the lamp are made. The bulb may be blown in any suitable manner, preferably by means of machinery and by means of air which is so dry that it contains practically no moisture and by the aid of a mold 2 which is placed in a convenient location adjacent the furnace. The bulb is removed from the mold 2 and while still hot is transferred to a tubulating machine mounted in any convenient relation to the glass blowing room, preferably on a table or support 3 on which the machines for carrying out the other operations necessary for the production of the complete lamp are also mounted in convenient relation to each other. The hot bulb from the mold may be tubulated in any suitable manner, preferably by means of a machine comprising a standard 4 on which there is a bulb support 5 for holding the bulb with its end in such a position that the tip is heated by means of burners 6. The tubulature is held in a slidable tubular connection 7 which is connected through a flexible tube 8 to an exhaust pipe 9 controlled by a valve 10, which in turn is controlled by a handle 11 by means of which the connection 11 may be moved up and down. The hot bulb from the mold 2 is placed in the bulb holder 5; the end is further heated by the burners 6 until it becomes soft and then the handle 11 is manipulated to bring the tubulature in the connection 7 in to engagement with the heated end of the bulb, this same movement of the handle 11 opening valve 10 and thereby connecting the tubulature to the exhaust pump, whereupon the suction exerted by the exhaust pump produces an opening in the end of the bulb and at the same time the tubulature is sealed to the bulb. This operation is very quickly performed and the bulb while still hot is transferred to the blowing-off machine, comprising the bulb holder 12 in which the bulb is mounted in such a position that the neck projects into the flames from a ring of burners 13. The bulb holder 12 is mounted on a rotating head 14 and by means of a cap 15 and supply pipe 16 compressed air is supplied through the tubulature to the interior of the bulb. As the bulb rotates, the flame of the blowing off burners 13 softens the neck until finally the excess portion of the neck drops away and a thin film of glass forms across the neck of the bulb. Air under pressure is then admitted to the interior of the bulb through the pipe 16 and blows the thin film across the neck of the bulb into a bubble which bursts and leaves the neck of the bulb ready to receive the stem. This operation is quickly performed, and the hot bulb is then placed in a sealing-in machine comprising a rotating head 17 provided with a bulb holder 18 and driven by means of the pulley 19. The stem is placed on the upper end of a slidable rod 20 so arranged that when it is lifted by the operator into the position shown in the drawing, the edge of the stem is brought into engagement with the edge of the neck of the bulb, whereupon the flames from the sealing-in burners 21 fuse the edge of the stem and the neck of the bulb together and thereby seal the stem into the bulb, at the same time keeping the lamp hot. To assist in the sealing-in operation, the tubulature of the lamp is connected through a flexible connection 22 to a pipe 23 supplied with compressed air from any suitable source and provided with a vent opening 24ª controlled by the finger of the operator so that the amount of pressure in the interior of the bulb may be accurately regulated. After the stem is sealed into the bulb, the hot lamp is quickly transferred to the exhausting machine which is mounted adjacent the sealing-in machine and the tubulature is inserted in the connection 24 which is connected to the exhaust pumps through a suitable valve. In order to guard against the possibility of the lamp becoming cool during the process of exhaustion heaters 26 are mounted in a position to keep the lamp hot during the process of exhaustion. Current for heating the filament during the process of exhaustion is supplied in any suitable way, preferably by means of contacts 27 mounted on a slidable standard or support 28 so that the contacts may be brought into engagement with the leading-in wires when desired and through suitable connections the amount of current flowing through the filament of the lamp is controlled by means of a rheostat 29, which in turn is regulated by the handle 25. As soon as the lamp has been properly exhausted, the operator seals off in the usual manner by means of the blow pipe 30. During all the operations above described and from the time the molten glass is first formed into a lamp part until the completed lamps are taken off the exhausting machine the parts of the lamp have been maintained at a temperature considerably above the temperature at which moisture or gases are occluded by the material of the lamp, consequently there is no moisture or gas occluded on the inner walls of the lamp, and the vacuum is much better than in lamps made in the usual way.

The direct connection of the evacuating process with the fusing-in of the stems without intermediate cooling and consequent reheating at the pump has the particular advantage, besides decreasing the absorption, that no cracks are formed at the leading-in wires or at the points of fusion between globe and lamp base, thereby obviating the danger of leakage.

By the process described the quality of the incandescent lamps is substantially improved, waste is reduced, and cost of manufacture is lessened.

Having now fully described my invention, what I claim as new and desire to secure by Letters Patent of the United States, is:

1. The process of manufacturing an evacuated vitreous vessel which consists in forming the vessel from heated plastic material and exhausting and sealing said vessel before it becomes cool.

2. The process of manufacturing an evacuated vitreous vessel which consists in making the parts of said vessel from heated plastic material, fusing said parts together while still heated to form a vessel, and exhausting and sealing said vessel before it becomes cool.

3. The process of forming an evacuated bulb which consists in blowing said bulb, sealing a stem in said bulb before it becomes cool, and exhausting and sealing said bulb before it becomes cool enough to absorb gases.

4. The process of forming an evacuated vessel which consists in making parts of a vessel from molten glass, sealing said parts together while still hot to form a vessel, and exhausting and sealing said vessel while said parts are still hot.

5. The process of manufacturing a lamp which consists in fusing glass, making lamp parts from said fused glass and while still hot assembling and exhausting said lamp.

6. The process which consists in manufacturing an incandescent lamp from a bulb kept hot since blown from fused glass, and exhausting and sealing the lamp while said bulb is still hot.

7. The process of manufacturing an incandescent lamp, which consists in forming the bulb and then while still hot and free from gases and vapors adding the stem and other parts and completing the exhaustion.

8. The process, which consists in blowing bulbs for incandescent electric lamps, keeping said bulbs hot from the instant they are blown and then making the bulbs into completed lamps while said bulbs are still hot.

9. The process of making incandescent electric lamps, which consists in blowing the bulbs and then completing the assembling and exhaustion of the lamps while the bulbs are still hot.

In witness whereof, I have hereunto set my hand this 4th day of November 1908.

DR. ARNOLD BERLINER.

Witnesses:
HANS GOLLUS,
GUSTAV MATTHIS.